(12) United States Patent
Bai

(10) Patent No.: US 6,214,946 B1
(45) Date of Patent: Apr. 10, 2001

(54) INERT PARTICULATE MATERIAL PASSIVATION FOR SINGLE-SITE CATALYST IN EPDM PRODUCTION

(75) Inventor: Xinlai Bai, Piscataway, NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/315,192

(22) Filed: May 19, 1999

(51) Int. Cl.$^7$ .............................. C08F 2/34; C08F 4/642; C08F 210/18
(52) U.S. Cl. ...................... 526/88; 526/153; 526/160; 526/336; 526/901; 524/855; 524/856; 523/215
(58) Field of Search ..................................... 524/855, 856; 523/215; 526/153, 160, 336, 901, 88

(56) References Cited

U.S. PATENT DOCUMENTS

| | | | |
|---|---|---|---|
| 5,041,473 | * 8/1991 | Gau et al. | 524/855 X |
| 5,212,232 | 5/1993 | Kuramoto et al. | 524/779 |
| 5,317,036 | 5/1994 | Brady, III et al. | 523/223 |
| 6,025,448 | * 2/2000 | Swindoll et al. | 526/901 X |

* cited by examiner

*Primary Examiner*—Fred Teskin
(74) *Attorney, Agent, or Firm*—Robert C. Brown

(57) ABSTRACT

There is provided a process for the gas phase production of an ethylene-propylene or ethylene-propylene-diene rubber in the presence of a single site or single-site like catalyst (e.g., metallocene) catalyst system and an inert particulate material comprising pretreating the inert particulate material with trialkylaluminum (e.g., tri-isobutylaluminum) before commencing polymerization.

11 Claims, No Drawings

INERT PARTICULATE MATERIAL PASSIVATION FOR SINGLE-SITE CATALYST IN EPDM PRODUCTION

FIELD OF THE INVENTION

The present invention relates to gas phase EPDM production employing an inert particulate material and a single-site (e.g., metallocene) catalyst. More particularly, the invention provides a method for passivating an inert particulate material (e.g., carbon black) such that it can be employed with a metallocene catalyst in the production of ethylene-propylene rubber such as an ethylene-propylene-diene rubber (EPDM).

BACKGROUND OF THE INVENTION

Ethylene propylene rubbers (including diene rubbers) are commercially produced in a gas phase process above the softening or sticking temperature of the polymer product by using an inert particulate material such as carbon black, silica, clay or talc, as disclosed in U.S. Pat. No. 4,994,534. The inert particulate material serves to make the forming bed of polymer fluidizable. Hence, it is required to prevent agglomeration of the bed in the gas phase reactor. The preferred inert particulate material is carbon black. Carbon black is preferred because it is most often included in molded or extruded article by an end user.

Presently, the catalyst of choice in gas phase polymerization is a vanadium catalyst (e.g., vanadium acetylacetonate supported on silica), though a titanium catalyst can be employed. However, the use of a vanadium catalyst does not afford latitude for producing a wide variety of EPR differing in amounts of individual monomers comprising them and various molecular weights and/or molecular weight distribution. Solution, slurry, and bulk EPR processes, which do not employ inert particulate material in the polymerization, employ a metallocene catalyst for these purposes.

However, in gas phase production requiring an inert particulate material, such as carbon black, attempts to use a metallocene catalyst, it has been discovered that the carbon black has a strong poisoning effect on the metallocene catalyst. That is, the poisoning effect of carbon black (CB) consumes cocatalyst such as MAO or modified MAO (MMAO) and decreases catalyst activity. Hence, more aluminoxane is needed in order to obtain sufficient metallocene activity and the catalyst cost is substantial.

Therefore, there exists, a need for a passivation process which alleviates the poisoning effects of inert particulate materials such as carbon black on metallocene catalysts so that catalyst activity increases and provides a reduction in the high cost of using aluminoxane such as methylaluminoxane (MAO) cocatalyst in the production of EPR.

SUMMARY OF THE INVENTION

Surprisingly, it has been discovered that the above-enumerated problems can be solved by contacting the carbon black with a trialkyl aluminum (e.g., tri-isobutylaluminum) prior polymerizing the monomers comprising EPR. There is provided a process for the gas phase production of an ethylene-propylene or ethylene-propylene-diene rubber in the presence of a single-site catalyst and an inert particulate material comprising pretreating the inert particulate material before commencing polymerization with a trialkylaluminum having the formula $AlR_3$, wherein each R is independently an alkyl having 1 to 14 carbon atoms.

DETAILED DESCRIPTION OF THE INVENTION

Pretreatment/Passivation. By passivation is meant that the inert particulate material (e.g., carbon black) is contacted with a trialkylaluminum, such as tri-isobutylaluminum (TIBA), such that the trialkylaluminum reacts with or "passivates" surface active or functional groups commonly associated with the inert particulate material. Surface active groups are contaminants resulting from the process for producing the inert particulate materials. These surface functional groups can include, for example, —OH, —COOH, —SH, —CO, —C(O)H, C(O)R, —OR, —COOR, —COOC, and mixtures thereof.

Passivation of the inert particulate material can be accomplished in at least three ways. One way, is to pretreat the inert particulate material with trialkylaluminum compound in a slurry using a diluent such as by using an aliphatic hydrocarbon having 5 to 20 carbon atoms, for example, hexane. The diluent can also be an aromatic hydrocarbon having 6 to 20 carbon atoms. Of course, if desired mixtures of these two kinds of diluents can be employed. This is followed by evacuation or purging at ambient or room temperature of the diluent to obtain dry inert particulate material. The dried passivated or pretreated inert particulate material is then introduced into the polymerization process. Preferably, it is introduced continuously via a feeding line into a fluid bed reactor, while simultaneously introducing catalyst and cocatalyst separately or together through one or more feeding lines.

The ratio of trialkylaluminum compound to the inert particulate material in diluent ranges from 0.001 mmol trialkylaluminum compound per gram inert particulate material to 100 mmol trialkylaluminum compound per gram inert particulate material; preferably 0.01 mmol trialkylaluminum compound per gram inert particulate material to 10 mmol trialkylaluminum compound per gram inert particulate material; most preferably about 0.03 mmol trialkylaluminum compound per gram inert particulate material to 0.60 mmol trialkylaluminum compound per gram inert particulate material.

A second procedure for passivating inert particulate material is to introduce dry untreated inert particulate material into a reactor and there contacting it with a trialkylaluminum slurry followed by removal of the diluent (e.g. hexane). The catalyst system and monomers are then introduced or fed to the reactor in any manner known to those skilled in the art to commence polymerization.

A third procedure for passivating the inert particulate material comprises first connecting three separate feeding lines to a reactor such that the untreated inert particulate material (e.g., CB), the passivating reagent or trialkylaluminum (e.g., TIBA) feeding line, and the cocatalyst/catalyst feeding line coexist. This is followed by simultaneously and continuously feeding the catalyst/cocatalyst, untreated inert particulate material, and TIBA into a reactor, along with or followed by the addition of one or more of the monomers to commence polymerization.

Single-Site Catalyst. The single site catalyst may be a metallocene, i.e., an organometallic coordination complex of one or more π-bonded moieties (i.e., cycloalkadienyl groups) in association with a metal atom from Groups IIIB to VIII or the Lanthanide series of the Periodic Table of Elements. Bridged and unbridged mono-, di-, and tri-cycloalkadienyl/metal compounds are the most common metallocenes, and generally are of the formula:

$$(L)_y R^1{}_z (L')MX_{(x-y-1)} \qquad (I)$$

wherein M is a metal from groups IIIB to VIII or a rare earth metal of the Periodic Table; L and L' are the same or different and are π-bonded ligands coordinated to M, preferably cycloalkadienyl groups such as cyclopentadienyl, indenyl, or fluorenyl groups optionally substituted with one or more hydrocarbyl groups containing 1 to 20 carbon atoms; $R^1$ is selected from the group consisting of $C_1$–$C_4$ substituted or unsubstituted alkylene radicals, dialkyl or diaryl germanium or silicon groups, and alkyl or aryl phosphine or amine radicals bridging L and L'; each X is independently hydrogen, an aryl, alkyl, alkenyl, alkylaryl, or arylalkyl radical having 1–20 carbon atoms, or a hydrocarboxy radical having 1–20 carbon atoms; y is 0, 1, or 2; x is 1, 2, 3, or 4 depending upon the valence state of M; z is 0 or 1 and is 0 when y is 0; and x-y$\geq$1.

Illustrative but non-limiting examples of metallocenes represented by formula I are dialkyl metallocenes such as bis(cyclopentadienyl)titanium dimethyl, bis(cyclopentadienyl)titanium diphenyl, bis(cyclopentadienyl)zirconium dimethyl, bis(cyclopentadienyl)zirconium diphenyl, bis(cyclopentadienyl)hafnium methyl and diphenyl, bis(cyclopentadienyl)titanium di-neopentyl, bis(cyclopentadienyl)zirconium di-neopentyl, bis(cyclopentadienyl)titanium dibenzyl, bis(cyclopentadienyl)zirconium dibenzyl, bis(cyclopentadienyl)vanadium dimethyl; the mono alkyl metallocenes such as bis(cyclopentadienyl)titanium methyl chloride, bis(cyclopentadienyl)titanium ethyl chloride, bis(cyclopentadienyl)titanium phenyl chloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide; the trialkyl metallocenes such as cyclopentadienyl titanium trimethyl, cyclopentadienyl zirconium triphenyl, and cyclopentadienyl zirconium trineopentyl, cyclopentadienyl zirconium trimethyl, cyclopentadienyl hafnium triphenyl, cyclopentadienyl hafnium trineopentyl, and cyclopentadienyl hafnium trimethyl; monocyclopentadienyl titanocenes such as pentamethylcyclopentadienyl titanium trichloride, pentaethylcyclopentadienyl titanium trichloride, bis(pentamethylcyclopentadienyl)titanium diphenyl; the carbene represented by the formula bis(cyclopentadienyl)titanium=$CH_2$ and derivatives of this reagent; substituted bis(cyclopentadienyl)titanium (IV) compounds such as bis(indenyl)titanium diphenyl or dichloride, bis(methylcyclopentadienyl)titanium diphenyl or dihalides; dialkyl, trialkyl, tetraalkyl and pentaalkyl cyclopentadienyl titanium compounds such as bis(1,2-dimethylcyclopentadienyl)titanium diphenyl or dichloride, bis(1,2-diethylcyclopentadienyl)titanium diphenyl or dichloride; silicon, phosphine, amine or carbon bridged cyclopentadiene complexes such as dimethyl silyldicyclopentadienyl titanium diphenyl or dichloride, methyl phosphine dicyclopentadienyl titanium diphenyl or dichloride, methylenedicyclopentadienyl titanium diphenyl or dichloride and other dihalide complexes, and the like, as well as isopropyl(cyclopentadienyl)(fluorenyl)zirconium dichloride, isopropyl(cyclopentadienyl)(octahydrofluorenyl)zirconium dichloride, diphenylmethylene(cyclopentadienyl)(fluorenyl)zirconium dichloride, diisopropylmethylene(cyclopentadienyl)(fluorenyl)zirconium dichloride, diisobutylmethylene(cyclopentadienyl)(fluorenyl)zirconium dichloride, ditertbutylmethylene (cyclopentadienyl)(fluorenyl)zirconium dichloride, cyclohexylidene(cyclopentadienyl)(fluorenyl)zirconium dichloride, diisopropylmethylene (2,5-dimethylcyclopentadienyl)(fluorenyl)-zirconium dichloride, isopropyl(cyclopentadienyl)(fluorenyl)-hafnium dichloride, diphenylmethylene(cyclopentadienyl)-(fluorenyl)hafnium dichloride, diisopropylmethylene-(cyclopentadienyl)(fluorenyl)hafnium dichloride, diisobutylmethylene (cyclopentadienyl)(fluorenyl)hafnium dichloride, ditertbutylmethylene(cyclopentadienyl)-(fluorenyl)hafnium dichloride, cyclohexylidene(cyclopentadienyl)(fluorenyl) hafnium dichloride, diisopropylmethylene(2,5-dimethylcyclopentadienyl)(fluorenyl)hafnium dichloride, isopropyl(cyclopentadienyl)(fluorenyl)titanium dichloride, diphenylmethylene(cyclopentadienyl)(fluorenyl)titanium dichloride, diisopropylmethylene(cyclopentadienyl)-(fluorenyl)titanium dichoride, diisobutylmethylene-(cyclopentadienyl)(fluorenyl)titanium dichloride, ditertbutylmethylene(cyclopentadienyl)(fluorenyl)titanium dichloride, cyclohexylidene(cyclopentadienyl)(fluorenyl) titanium dichloride, diisopropylmethylene(2,5dimethylcyclopentadienyl)-(fluorenyl)titanium dichloride, racemic-ethylene bis (1-indenyl) zirconium (IV) dichloride, racemic-ethylene bis (4,5,6,7-tetrahydro-1-indenyl) zirconium (IV) dichloride, racemic-dimethylsilyl bis (1-indenyl) zirconium (IV) dichloride, racemic-dimethylsilyl bis (4,5,6,7-tetrahydro-1-indenyl) zirconium (IV) dichloride, racemic-1,1,2,2-tetramethylsilanylene bis (1-indenyl) zirconium (IV) dichloride, racemic-1,1,2,2-tetramethylsilanylene bis (4,5,6,7-tetrahydro-1-indenyl) zirconium (IV), dichloride, ethylidene (1-indenyl tetramethylcyclopentadienyl) zirconium (IV) dichloride, racemic-dimethylsilyl bis (2-methyl-4-t-butyl-1-cyclopentadienyl) zirconium (IV) dichloride, racemic-ethylene bis (1-indenyl) hafnium (IV) dichloride, racemic-ethylene bis (4,5,6,7-tetrahydro-1-indenyl) hafnium (IV) dichloride, racemic-dimethylsilyl bis (1-indenyl) hafnium (IV) dichloride, racemic-dimethylsilyl bis (4,5,6,7-tetrahydro-1-indenyl) hafnium (IV) dichloride, racemic-1,1,2,2-tetramethylsilanylene bis (1-indenyl) hafnium (IV) dichloride, racemic-1,1,2,2-tetramethylsilanylene bis (4,5,6,7-tetrahydro-1-indenyl) hafnium (IV), dichloride, ethylidene (1-indenyl-2,3,4,5-tetramethyl-1-cyclopentadienyl) hafnium (IV) dichloride, racemic-ethylene bis (1-indenyl) titanium (IV) dichloride, racemic-ethylene bis (4,5,6,7-tetrahydro-1-indenyl) titanium (IV) dichloride, racemic-dimethylsilyl bis (1-indenyl) titanium (IV) dichloride, racemic-dimethylsilyl bis (4,5,6,7-tetrahydro-1-indenyl) titanium (IV) dichloride, racemic-1,1,2,2-tetramethylsilanylene bis (1-indenyl) titanium (IV) dichloride racemic-1,1,2,2-tetramethylsilanylene bis (4,5,6,7-tetrahydro-1-indenyl) titanium (IV) dichloride, and ethylidene (1-indenyl-2,3,4,5-tetramethyl-1-cyclopentadienyl) titanium IV) dichloride.

Another type of single site catalyst for use in the invention is a complex of a transition metal, a substituted or unsubstituted pi-bonded ligand, and one or more heteroallyl moieties, such as those described in U.S. Pat. No. 5,527,752. Preferably, such complexes have one of the following formulas:

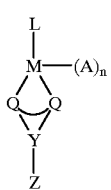

(II)

wherein:

M is a transition metal, preferably Zr or Hf;

L is a substituted or unsubstituted, pi-bonded ligand coordinated to M, preferably a cycloalkadienyl ligand;

each Q is independently selected from the group consisting of —O—, —NR—, —CR$_2$— and —S—, preferably oxygen;

Y is either C or S, preferably carbon;

Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from the group consisting of —OR, —NR$_2$, —SR, —SiR$_3$, —PR$_2$ and —H, preferably Z is selected from the group consisting of —OR, —CR$_3$ and —NR$_2$;

n is 1 or 2;

A is a univalent anionic group when n is 2 or A is a divalent anionic group when n is 1, preferably A is a carbamate, carboxylate, or other heteroallyl moiety described by the Q, Y and Z combination; and each R is independently a group containing carbon, silicon, nitrogen, oxygen, and/or phosphorus where one or more R groups may be attached to the L substituent, preferably R is a hydrocarbon group containing from 1 to 20 carbon atoms, most preferably an alkyl, cycloalkyl, or an aryl group and one or more may be attached to the L substituent; or

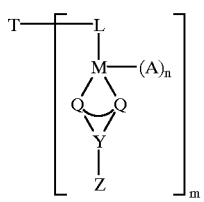

(III)

wherein:

M is a transition metal, preferably Zr or Hf;

L is a substituted or unsubstituted, pi-bonded ligand coordinated to M, preferably a cycloalkadienyl ligand;

each Q is independently selected from the group consisting of —O—NR—, —CR$_2$— and —S—, preferably oxygen;

Y is either C or S, preferably carbon;

Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from the group consisting of —OR, —NR$_2$, —SR, —SiR$_3$, —PR$_2$, —H, and substituted or unsubstituted aryl groups, preferably Z is selected from the group consisting of —OR, —CR$_3$ and —NR$_2$;

n is 1 or 2;

A is a univalent anionic group when n is 2 or A is a divalent anionic group when n is 1, preferably A is a carbamate, carboxylate, or other heteroallyl moiety described by the Q, Y and Z combination;

each R is independently a group containing carbon, silicon, nitrogen, oxygen, and/or phosphorus where one or more R groups may be attached to the L substituent, preferably R is a hydrocarbon group containing from 1 to 20 carbon atoms, most preferably an alkyl, cycloalkyl, or an aryl group and one or more may be attached to the L substituent;

T is a bridging group selected from the group consisting of alkylene and arylene groups containing from 1 to 10 carbon atoms optionally substituted with carbon or heteroatoms, germanium, silicone and alkyl phosphine; and m is 2 to 7, preferably 2 to 6, most preferably 2 or 3.

In formulas II and III, the supportive substituent formed by Q, Y and Z is a unicharged polydentate ligand exerting electronic effects due to its high polarizability, similar to the cyclopentadienyl group. In the most preferred embodiments of this invention, the disubstituted carbamates,

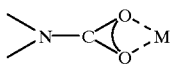

and the carboxylates

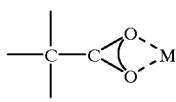

are employed.

Examples of complexes according to formulas II and III include indenyl zirconium tris(diethylcarbamate), indenyl zirconium tris(trimethylacetate), indenyl zirconium tris(p-toluate), indenyl zirconium tris(benzoate), (1-methylindenyl)zirconium tris(trimethylacetate), (2-methylindenyl) zirconium tris(diethylcarbamate), (methylcyclopentadienyl) zirconium tris(trimethylacetate), cyclopentadienyl tris(trimethylacetate), tetrahydroindenyl zirconium tris(trimethylacetate), and (pentamethylcyclopentadienyl) zirconium tris(benzoate). Preferred examples are indenyl zirconium tris (diethylcarbamate), indenyl zirconium tris (trimethylacetate), and (methylcyclopentadienyl) zirconium tris(trimethylacetate).

Another type of single site catalyst that can be used in accordance with the invention is a constrained geometry catalyst of the formula:

(IV)

wherein:

M is a metal of groups IIIB to VIII of the Periodic Table;

Cp is a cyclopentadienyl or substituted cyclopentadienyl group bound in an $\eta^5$ mode to M;

Z' is a moeity comprising boron, or a member of group IVB of the Periodic Table and optionally sulfur or oxygen, the moiety having up to 20 non-hydrogen atoms, and optionally Cp and Z' together from a fused ring system;

X' is an anionic ligand group or neutral Lewis base ligand group having up to 30 non-hydrogen atoms;

a is 0, 1, 2, 3, or 4 depending on the valence of M; and

Y' is an anionic or non-anionic ligand group bonded to Z' and M is nitrogen, phosphorus, oxygen or sulfur having up to 20 non-hydrogen atoms, and optionally Y' and Z' together form a fused ring system.

Constrained geometry catalysts are well known to those skilled in the art and are disclosed in, for example, U.S. Pat. Nos. 5,026,798 and 5,055,438 and published application EP 0 416 815 A2.

Illustrative but not limiting examples of substituents Z',Cp, Y', X' and M in formula IV are:

| Z' | Cp | Y' | X' | M |
|---|---|---|---|---|
| dimethyl-silyl | cyclopenta di-enyl | t-butylamido | chloride | titanium |
| methyl-phenylsilyl | fluorenyl | phenylamido | methyl | zirconium |
| diphenyl-silyl | idenyl | cyclohexylamido | | hafnium |
| tetramethyl-ethylene | | oxo | | |
| ethylene | tetramethyl-cyclopentadienyl | | | |
| diphenyl-methylene | | | | |

The invention is also useful with another class of single-site cataylsts, di(imine) metal complexes, as described in PCT application No. WO 96/23010. Such di(imine) metal complexes are transition metal complexes of bidentate ligands selected from the group consisting of:

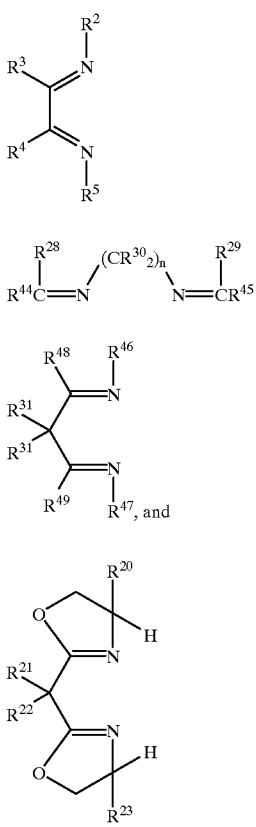

wherein said transition metal is selected from the group consisting of Ti, Zr, Sc, V, Cr, a rare earth metal, Fe, Co, Ni, and Pd;

$R^2$ and $R^5$ are each independently hydrocarbyl, or substituted hydrocarbyl, provided that the carbon atom bound to the imino nitrogen atom has at least two carbon atoms bound to it;

$R^3$ and $R^4$ are each independently hydrogen, hydrocarbyl, substituted hyrocarbyl, or taken together are hydrocarbylene or substitued hydrocarbeylene to form a carbocyclic ring;

$R^{44}$ is hydrocarbyl or substituted hydrocarbyl, and $R^{28}$ is hydrogen, hydrocarbyl, or substituted hydrocarbyl, or $R^{44}$ and $R^{28}$ taken together form a ring;

$R^{45}$ is hydrocarbyl or substituted hydrocarbyl, and $R^{29}$ is hydrogen, substituted hydrocarbyl, or hydrocarbyl, or $R^{45}$ and $R^{29}$ taken together form a ring;

each $R^{30}$ is independently hydrogen, substituted hydrocarbyl or hydrocarbyl, or two of $R^{30}$ taken together form a ring;

each $R^{31}$ is independently hydrogen, hydrocarbyl, or substituted hydrocarbyl;

$R^{46}$ and $R^{47}$ are each independently hydrocarbyl or substitued hydrocarbyl, provided that the carbon atom bound to the imino nitrogen atom has at least two carbon atoms bound to it;

$R^{48}$ and $R^{49}$ are each independently hydrogen, hydrocarbyl, or substituted hydrocarbyl;

$R^{20}$ and $R^{23}$ are independently hydrocarbyl or substituted hydrocarbyl;

$R^{21}$ and $R^{22}$ are each independently hydrogen, hydrocarbyl, or substituted hydrocarbyl; and n is 2 or 3 and provided that:
said transition metal also has bonded to it a ligand that may be displaced by or added to the olefin monomer being polymerized; and
when the transition metal is Pd, said bidentate ligand is (V), (VII) or (VIII).

Most preferred catalysts (such as in the examples herein) include a silyl amide catalyst $(C_5Me_4)Me_2Si(N\text{-}t\text{-}Bu)TiCl_2$ described as ACT;
a diphenylmethylidene(cyclopentadienyl)-(9-fluorenyl) zirconium dichloride $[C_5H_4C(C_6H_5)_2(C_{13}H_8)ZrCl_2]$ described as DPZ; and an ethylene bridged bis-fluorenyl zirconium dichloride described as EFlZr.

The co-catalyst employed with the above-enumerated precursors is an aluminoxane such as methylaluminoxane (MAO) or modified methylaluminoxane (MMAO).

EPR Process. The invention can be used for the polymerization ethylene-propylene and ethylene-propylene-diene rubbers in known gas phase processes using known equipment and reaction conditions. However, the preferred polymerization process is a gas phase process employing a fluidized bed. Gas phase processes in which the present invention can be employed include so-called "conventional" gas phase processes and "condensed-mode" processes, and most recent, "liquid mode" processes.

Conventional fluidized processes are disclosed, for example, in U.S. Pat. Nos. 3,922,322; 4,035,560; 4,994,534, and 5,317,036. Condensed mode polymerizations, including induced condensed mode, are taught, for example, in U.S. Pat. Nos. 4,543,399; 4,588,790, 4,994,534; 5,317,036; 5,352,749; and 5,462,999. Liquid mode or liquid monomer gas phase polymerization is described in U.S. Pat. No. 4,453,471; U.S. Ser. No. 510,375; and WO 96/04322 (PCT/US95/09826) and WO 96/04323 (PCT/US95/09827). For polymerizations of ethylene-propylene copolymers (e.g., EPMs), and ethylene-propylene-diene terpolymers (e.g., EPDMs), an inert particulate material, a so-called fluidization aid, is employed. When one or more dienes are employed it is preferred to employ liquid mode processes.

Inert Particulate Materials. Inert particulate materials are described, for example, in U.S. Pat. No. 4,994,534 and include carbon black, silica, clay, talc, and mixtures thereof. Activated carbon black such as that disclosed in EP 0 727,447 can also be employed. Modified carbon black such as those disclosed in WO 98/34960 can also be used if desired. Of these, carbon black, silica, and mixtures of them are preferred. Carbon black is most preferred. The carbon black materials employed have a primary particle size of about 10 to 100 nanometers, an average size of aggregate (primary structure) of about 0.1 to about 10 microns, specific surface area of about 30 to 1,500 $m^2$/gm, and optionally display a dibutylphthalate (DBP) absorption of about 80 to 350 cc/100 gms. Employable silica materials are amorphous having a primary particle size of about 5 to about 50 nanometers, an average size of aggregate of about 0.1 to about 10 microns, an average size of agglomerate of about 2 to about 120 microns, a specific surface area of about 50 to 500 $m^2$/gm, and a DBP absorption of 100 to 400 cc/100 grams. The clays which can be employed have an average particle size of about 0.01 to about 10 microns, a specific surface area of 3 to 30 $m^2$/gm and absorption of about 20 to 100 gms/100 grams.

When employed as fluidization aids (FA), these inert particulate materials are used in amounts ranging from about 0.3 to about 80% by weight, preferably about 2 to 50% based on the weight of the polymer produced. In the case of sticky polymers, such as EPR (EPDM and EPM), these resin particles are produced by a fluidized bed polymerization process at or above the softening point of the sticky polymer.

The polymerizations can be carried out in a single reactor or multiple reactors, typically two or more in series, can also be employed. Preferably a single reactor is employed. The essential parts of the reactor are the vessel, the bed, the gas distribution plate, inlet and outlet piping, at least one compressor, at least one cycle gas cooler, and a product discharge system. In the vessel, above the bed, there is a velocity reduction zone, and in the bed a reaction zone.

Generally, all of the above modes of polymerizing are carried out in a gas phase fluidized bed containing a "seed bed" of polymer which is the same or different from the polymer being produced. Preferably, the bed is made up of the same granular resin that is to be produced in the reactor.

The bed is fluidized using a fluidizing gas comprising the monomer or monomers being polymerized, initial feed, make-up feed, cycle (recycle) gas, inert carrier gas (e.g., nitrogen, argon, or inert hydrocarbon such as ethane, propane, isopentane) and, if desired, modifiers (e.g., hydrogen). Thus, during the course of a polymerization, the bed comprises formed polymer particles, growing polymer particles, catalyst particles, and optional flow aids (fluidization aids) fluidized by polymerizing and modifying gaseous components introduced at a flow rate or velocity sufficient to cause the particles to separate and act as a fluid.

In general, the polymerization conditions in the gas phase reactor are such that the temperature can range from sub-atmospheric to super-atmospheric, but is typically from about 0 to 120° C., preferably about 40 to 100° C., and most preferably about 40 to 80° C. Partial pressure will vary depending upon the particular monomer or monomers employed and the temperature of the polymerization, and it can range from about 1 to 300 psi (6.89 to 2,006 kiloPascals), preferably 1 to 100 psi (6.89 to 689 kiloPascals).

Dienes. Dienes employed in the production of EPR can include: conjugated or non-conjugated dienes, such as linear, branched, or cyclic hydrocarbon dienes and vinyl aromatic compounds having from about 4 to about 20, preferably 4 to 12, carbon atoms. Preferred dienes include 1,4-pentadiene, 1,5-hexadiene, 5-vinyl-2-norbornene, 1,7-octadiene, 7-methyl-1,6-octadiene (MOD), vinylcyclohexene, dicyclopentadiene, butadiene, isoprene, ethylidene norbornene (ENB), and the like. Most preferred are: 5-ethylidene-2-norbornene and MOD.

All references are incorporated herein by reference.

Whereas the scope of the invention is set forth in the appended claims, the following examples illustrate certain aspects of the present invention. The examples are set forth for illustration and are not necessarily to be construed as limitations on the invention, except as set forth in the claims. Throughout the specifications all parts and percentages are by weight unless otherwise stated.

EXAMPLES

I. Lab Slurry Polymerization Examples

Comparative Example 1

Standard Lab Polymerization with ACT Catalyst without CB.

In a glove box under nitrogen, an oven dried 10 ml volumetric flask was charged with 0.0184 g ACT catalyst. This vial was sealed and removed from the glove box. Toluene (10 ml, Aldrich anhydrous toluene, packaged under nitrogen) was added to the flask to form a solution with a concentration of 0.005M.

A small oven dried glass vial with a stir bar was sealed under nitrogen. To this vial, 6 $\mu$mole Ti or 1.2 ml of 0.005M ACT in toluene solution was premixed with 3.3 ml of 1.8M MAO in toluene solution (Al/Ti=1000) for 30 minutes.

The 1L stainless steel Fluitron® reactor was baked for one hour at 100° C. with nitrogen constantly flowing through it. It was cooled to 40° C. and charged with 500 ml of hexane, 1 ml TIBA (0.87M in heptane), and 2 ml ENB (purified). The reactor was sealed and brought to 65° C. Ethylene ($C_2$) and propylene ($C_3$) gases ($C_3/C_2$ fill ratio=0.75 to 1) were charged to the reactor until the reactor pressure reached 90 psi. The ratio of the gases was adjusted to $C_3/C_2$=0.20. The polymerization was initiated by injecting under pressure 5 $\mu$mol Ti or 3.77 ml of ACT+MAO mixture. The polymerization was conducted for 1 hour after catalyst/MAO was injected. ENB (0.5 ml) was injected to the reactor under pressure at a polymerization time of 10 minutes and 30 minutes, respectively. Therefore, a total of 3 ml ENB was added to the reactor. Polymerization was terminated by injecting 2 ml of ethanol killing solution (0.5 g BHT, i.e., 2,6-di-t-butylated-4-methylphenol; 1.0 g Kemamine®, (#AS-900, a product of Witco Corp.); and 0.5 g Irganox® (#1076, a product of Ciba-Geigy) in 125 ml ethanol). The $C_2$ and $C_3$ gases were shut down and the reactor was vented and cooled in room temperature. The polymer was scooped out, blended in methanol, and dried in a vacuum oven at 40° C. overnight. The polymer collected weighed 38 g, for catalyst activity of 7.6 Kg (EPDM)/mmol Ti/hr. The polymer FI (flow index) is 0.84.

Example 2

Demonstration that CB (Carbon Black N-650 available from Columbia) without Passivation Severely Poisons Catalyst.

In a glove box under nitrogen, an oven dried 10 ml volumetric flask was charged with 0.0184 g ACT catalyst. This vial was sealed and removed from the glove box. Toluene (10 ml of Aldrich anhydrous toluene, packaged under nitrogen) was added to the flask to form a solution with a concentration of 0.005M.

The 1L stainless steel Fluitron® reactor was baked for one hour at 100° C. with nitrogen constantly flowing through it. It was cooled to 40° C. and charged with 500 ml hexane, 1 ml TIBA (0.87M in heptane), 2 ml ENB (purified) and 5 g N-650 FA CB. This carbon black was previously dried at 190° C. under vacuum for 4 hours. The reactor was sealed and brought to 65° C. Ethylene ($C_2$) and propylene ($C_3$) gases ($C_3/C_2$ fill ratio 0.75 to 1) were charged to the reactor until the reactor pressure reached 90 psi. The ratio of the gases was adjusted to C3/C2=0.20. Under pressure, 2.77 ml of 1.8M MAO in toluene solution was added. The polymerization was initiated by injecting under pressure 1.0 ml of 0.005M ACT (5 μmol) in toluene solution (MAO/Ti=1000). The polymerization was carried out for 1 hour after catalyst was injected. ENB(0.5 ml) was injected to the reactor under pressure at a polymerization time of 10 minutes and 30 minutes. Therefore, a total of 3 ml ENB was added to the reactor. Polymerization was terminated by injecting 2 ml of ethanol killing solution (0.5 g BHT, 1.0 g Kemamin®e, 0.5 g Irganox® in 125 ml ethanol). The $C_2$ and $C_3$ gasses were shut down and the reactor was vented and cooled to room temperature. The polymer was scooped out, blended in methanol, and dried in a vacuum oven at 40° C. overnight. The polymer collected weighed only 1.1 g of EPDM polymer not enough for FI measurement.

Example 3
Demonstration of Slurry Passivation Technology.

CB Passivation in slurry process: Previously dried (under vacuum at 190° C. for 4 hours) N-650 CB was weighed (15 g) and put into an airless flask. Hexane (50 ml) was added to the flask to make a slurry. Then 7.24 ml of 0.87M TIBA (6.3 mmol TIBA) was added and the mixture was stirred under nitrogen for 1 hour and dried under vacuum. The flask with dry CB was transferred to the glove box for storage and this TIBA passivated CB will be used in EPDM polymerization.

Similar polymerization as Example 2 was carried out, except that 5 g of TIBA passivated CB was used instead of unpassivated N-650 CB. After polymerization, 36.5 g of EPDM polymer was collected for catalyst activity of 7.30 Kg(EPDM)/mmolTi/h and polymer Fl of 30.6. This experiment clearly showed that with passivated CB, full ACT based activity can be obtained.

Example 4
Demonstration of Gas Phase Passivation Technology.

In this experiment, CB (N-650) passivation was carried out in gas phase instead of in slurry. Previously dried (under vacuum for 4 hours at 190° C.) CB was weighted (11.0 g) and put into a dish in the glove box. To this CB in the dish, 2.66 ml of 0.87M TIBA solution (0.21 mmol Al/g CB) was added and the mixture was stirred periodically for a few hours in the glove box. During the stirring process, the solvent brought with TIBA solution was almost all vaporized in the glove box. The TIBA/CB mixture was transferred to a bottle, sealed and removed from the glove box. This bottle was placed on a roller for 24 hours and then transferred back into the glove box for storage. This TIBA passivated CB will be used in EPDM polymerization.

Similar polymerization as Example 2 was carried out, except that 5 g of TIBA passivated N-650 CB above was used instead of unpassivated N-650 CB. After polymerization 36.3 g of EPDM polymer was collected for catalyst activity of 7.26 Kg (EPDM)/mmolTi/h and polymer Fl of 38.7. From this experiment one can also see that full ACT based activity can be obtained with the CB passivated with TIBA and the gas phase passivation works very well.

Comparative Example 5
Demonstration of Passivation Technology with trimethylaluminum (TMA) Is Not as Good as with TIBA.

Similar experiment as Example 3 was carried out, except that during CB passivation process, TMA (0.42 mmol/g CB) instead of TIBA (0.42 mmol/g CB) was used. After polymerization 15.6 g of EPDM polymer was collected for catalyst activity of 3.12 Kg(EPDM)/mmolTi/h. Under similar conditions, the ACT based activity is higher than that with unpassivated CB, but lower than that with TIBA passivated CB.

Comparative Example 6
Demonstration of Passivation Technology with tri-n-hexylaluminum (TnHAL) is Not as Good as TIBA.

A similar experiment as Example 3 was carried out, except that during CB passivation process, TnHAl (0.42 mmol/g CB) instead of TIBA (0.42 mmol/g CB) was used. After polymerization 12.1 g of EPDM polymer was collected for catalyst activity of 2.42 Kg (EPDM)/mmolTi/h. Under similar conditions, the ACT based activity is higher than that with unpassivated CB but lower than that with TIBA passivated CB.

Comparative Example 7
Demonstration of Passivation Technology with triethylaluminum (TEAL) Is Not as Good as TIBA.

Similar experiment as Example 3 was carried out, except that during CB passivation process, TEAL (0.42 mmol/g CB) instead of TIBA (0.42 mmol/g CB) was used. After polymerization 13.6 g of EPDM polymer was collected for catalyst activity of 2.72 Kg (EPDM)/mmol Ti/h. Under similar conditions, the ACT based activity is higher than that with unpassivated CB but lower than that with TIBA passivated CB.

Comparative Example 8
Standard Control Run with DPZ Catalyst.

In a glove box under nitrogen, an oven dried 10 ml volumetric flask was charged with 0.01 lg DPZ catalyst. This flask was sealed and removed from the glove box. Toluene (10 ml of Aldrich anhydrous toluene, packaged under nitrogen) was added to the flask to form a solution with a concentration of 0.00156M.

A small oven dried glass vial with a stir bar was sealed under nitrogen. To this vial, 1.28 ml of 0.00156M DPZ (2 μmole Ti) in toluene solution was premixed with 1.67 ml of 1.8M MAO (1000 eq Al/Ti) in toluene solution for 30 minutes.

The 1L stainless steel Fluitron® reactor was baked for one hour at 100° C. with nitrogen constantly flowing through it. It was cooled to 40° C. and charged with 500 ml hexane, 2 ml TIBA (0.87M in heptane), and 2 ml ENB (purified). The reactor was sealed and brought to 65° C. Ethylene ($C_2$) and propylene ($C_3$) gases ($C_3/C_2$ fill ratio=0.75 to 1) were charged to the reactor until the reactor pressure reached 90 psi. The ratio of the gases was then adjusted to $C_3/C_2$=0.20. The polymerization was initiated by injecting under pressure 2.95 ml of DPZ+MAO solution (2μmol Ti) mixture. The polymerization was carried out for 1 hour after catalyst/MAO was injected. 0.5 ml of ENB was injected to the reactor under pressure at polymerization time of 10 minutes and 30 minutes. Therefore, a total of 3 ml ENB were added to the reactor. Polymerization was terminated by injecting 2 ml of ethanol killing solution (0.5 g BHT, 1.0 g Kemamine®, 0.5 g Irganox® in 125 ml ethanol). The $C_2$ and $C_3$ gases were shut down and the reactor was vented and cooled to room temperature. The polymer was scooped out, blended in methanol, and dried in a vacuum oven at 40° C.

overnight. The polymer collected weighted 53.4 g, for catalyst activity of 26.7 Kg (EPDM)/mmol Zr/hr. The polymer FI was 41.0.

Example 9
Demonstration of the Poisonous Effect of CB to DPZ Catalyst.

A similar experiment as in Example 8 was carried out, except 5 grams of dried N-650 FA CB was added to the reactor with 500 ml hexane, 2 ml TIBA and 2 ml ENB (purified). The CB was dried under vacuum for 4 hours at 190° C. before it was charged into the reactor.

After polymerization only 6.01 g EPDM polymer was collected for the catalyst activity of 3.0 Kg (EPDM)/mmol Zr/hr.

Example 10
Demonstration of CB Passivation with TIBA Works with DPZ Catalyst.

CB passivation in slurry process: Previously dried (under vacuum at 190° C. for 4 hours) N-650 CB was weighed (15 g) and put into an airless flask. 50 ml of hexane was added to the flask to make a slurry. Then 7.24 ml of 0.87M TIBA (6.3 mmol TIBA) was added, and the mixture was stirred under nitrogen for 1 hour and dried under vacuum. The flask with dry CB was transferred to the glove box for storage and this TIBA passivated CB will be used in EPDM polymerization.

A similar experiment as in Example 8 was carried out, except 5 grams of passivated N-650 CB was added to the reactor with the 500 ml hexane, 2 ml TIBA and 2 ml ENB (purified). After polymerization 32.2 g of EPDM polymer was collected for catalyst activity of 16.1 Kg(EPDM)/mmol Zr/h and polymer Fl of 34.8 The catalyst activity was much better than that of the using of unpasivated CB (Example 9).

The polymerization conditions and the polymer properties of the Examples 1 through 10 were all summarized in Table 1.

swept by these plows measured 40.6 cm (16 in) long by 39.7 cm (15.6 in.) in diameter, resulting in a mechanically fluidizable volume of 45 liters (1.65 ft$^3$). The gas volume, larger than the mechanically fluidizable volume due to the vertical cylindrical chamber plus other ancillary equipment in the reaction system, totaled 62.6 liters (2.21 ft$^3$).

Reactor pressure used was typically 350 psig. Ethylene, propylene and diene monomers were fed to the reactor continuously via control valves. Partial pressure of monomers ranged typically, for ethylene 240–320 psia and for propylene 35–90 psia. Gas composition was measured by a gas chromatography analyzer. Nitrogen made up the balance of the composition of the gas, entering with the catalyst and leaving via a small vent of the reactor gases. Vent opening was adjusted via computer to maintain constant total pressure in the reactor. The diene varied from 30–50 cc/lb of polymer produced.

The reactor was cooled by an external jacket of glycol. The bed temperature was measured using a temperature probe in a thermowell protruding into the bed between the inner set of plows. Reactor temperature was controlled to values in the range of 10°–110° C., although 20°–80° C. were typical for EPDM production.

Solution catalyst was added continuously for most of the batch, along with ethylene, propylene, diene monomers. The solution catalyst was carried through a solution catalyst feeder by nitrogen. Alkyl cocatalyst were also added continuously, at fixed molar ratios to the catalyst feed rate. As in a fluidized bed reactor, the cocatalyst feed rate was set so that catalyst activity was not compromised. Batch yields of granular polymer were 4–10 lbs. Runs lasted about 2–10 hours. A fluidization aid such as carbon black N-650 was used at 10–20 wt % level for preventing stickiness.

A run would commence with charging the reactor with the required amount of carbon black and passivating it with alkyl used in the run. Then the monomer was charged to the reactor and feeds (nitrogen and monomers) adjusted until the

TABLE 1

Effect of CB and Their Passivation on EPDM Polymerization with ACT and DPZ Catalysts

| Example No. | Catalyst (μmol) | TIBA (ml) | Carbon black (type/g) | yield (g) | Activity | FI | ENB(%) (NMR) | C3(%) (NMR) | Tc (° C.) |
|---|---|---|---|---|---|---|---|---|---|
| 1 | ACT(5) | 1 | 0 | 38 | 7600 | 0.84 | 3.5 | 33.8 | 5.48 |
| 2 | ACT(5) | 1 | CB/5 g | 1.1 | 220 | | | | |
| 3 | ACT(5) | 2 | TIBA-CB/5 g | 36.5 | 7300 | 30.6 | 1.9 | 30.2 | 16.2 |
| 4 | ACT(5) | 2 | TIBA-CB/5 g | 36.3 | 7256 | 38.7 | 2.3 | 31.2 | 13.8 |
| 5 | ACT(5) | 2 | TMA-CB/5 g | 15.6 | 3116 | nf | | | |
| 6 | ACT(5) | 2 | TnHAl-CB/5 g | 12.1 | 2424 | | 2.9 | 36.7 | 0.9 |
| 7 | ACT(5) | 2 | TEAL-CB 5 g | 13.6 | 2720 | | 2.5 | 37.5 | |
| 8 | DPZ(2) | 2 | 0 | 53.5 | 26700 | 41 | 3.1 | 25.9 | 25.8 |
| 9 | DPZ(2) | 2 | CB/5 g | 6 | 3000 | | 3.5 | 17.4 | 41.9 |
| 10 | DPZ(2) | 2 | TIBA-CB/5 g | 32.2 | 16100 | 34.8 | 4.3 | 22.8 | 33.5 |

Polymerization conditions: 65° C., Cocatalyst MAO: 1000 eq., CB: N-650, 3 ml ENB
Tc = recrystallization temperature of the polymer measured by DSC.
FI = Flow Index (g/10 min.) as determined by ASTM-1238, Condition F at 190° C., and 21.6 kilograms.

II. Gas Phase Pilot Plant Examples

EPDM Rubber via Gas Phase Polymerization in Stirred Bed Reactor

The reactor employed was a two-phase (gas/solid) stirred bed, back mixed reactor. A set of four plows were mounted horizontally on a central shaft rotate at 200 rpm to keep the particles in the reactor mechanically fluidized. The cylinder desired gas composition was reached. After catalyst feed started, monomers were added to the reactor sufficient to maintain gas concentrations. As the catalyst inventory built-up, polymer production rate increased to 3–10 lbs/hr, at which point catalyst feed was reduced to maintain constant polymer production rate. Alkyl rate was maintained in proportion to the catalyst feed rate. After the desired batch weight was made, the monomers were purged, the catalyst was deactivated with isopropanol and the polymer was stabilized with appropriate amounts of BHT/ZnO. Residual diene was purged with nitrogen for several hours until low level of diene only left in the polymer. The batch was discharged into a bag, open to atmosphere.

The polymerization conditions and the polymer properties of Examples 11 through 13 are summarized in Table 2. From these three examples one can see that using TIBA to passivate the FA CB decreases the total MMAO used (total Al/Ti ratio) while the Ti based productivity is maintained.

TABLE 2

Effect of TIBA Passivation and Comparison with MMAO Passivation with ACT Catalyst in Gas Phase

| Example No. | Passivation, mmolAl/gCB | Al/Ti (Reaction)* | Al/Ti (Total)** | Ti (ppm) | % C2 | % C3 | % ENB | wt % CB | Tc, (° C.) | Gum Mooney ML | Compound Mooney ML |
|---|---|---|---|---|---|---|---|---|---|---|---|
| 11 | MMAO(0.07) | 1250 | 1330 | 6.9 | 66 | 31.2 | 2.8 | 11 | 4 | 34 | 34 |
| 12 | TIBA(0.16) | 985 | 1167 | 6.5 | 63.2 | 33.5 | 3.3 | 12 | 3 | 31 | 37 |
| 13 | TIBA(0.08) | 1094 | 1183 | 6.6 | 62.5 | 32.8 | 4.7 | 13 | −1 | 32 | 38 |

T = 60° C., C2(partial pressure) = 240 psia; C3/C2 = 0.16; Total Pressure = 350 psig; Catalyst: ACT in toluene, concentration 7 mmol/L; Cocatalyst: MMAO for continuous feed; ENB was fed to the reactor at 29 cc/lb (C2 + C3) polymerized.
*for polymerization only.
**for polymerization and passivation.

Comparative Example No. 11
FA CB is passivated with MMAO.

Dry carbon black (2.1 lb) was charged into the stirred bed reactor and passivated with MMAO at 0.19 mmol/g. Ethylene, propylene and hydrogen were charged in such a way that $C_2$ pressure was 240 psia, ethylene/propylene ratio was 0.2 and hydrogen was 0.1 mole %. The reactor was maintained at 60° C. The ACT catalyst in toluene with a concentration of 7 mmol/l was contacted with 10% MMAO in isopentane in line for about 10 min and then passed into the reactor. When the polymerization rate was steady ethylene, propylene and ENB compositions were maintained by continuous flow of these components. The cocatalyst and catalyst were fed at Al/Ti ratio of 1250. After 5 hours, the reaction was terminated by adding isopropanol. Additives were added for stabilization. Unreacted monomers were purged with nitrogen and then the batch was discharged.

The polymer composition was found to be 31.2% propylene, 2.8% ENB and 66% ethylene. The Ti residue in the polymer was 6.9 ppm.

The gum Mooney of the product was 34 ML.

Example 12
FA CB Passivated with TIBA at 0.16 mmol/gCB

Similar experiment as Example 11 was carried out, except that FA CB was passivated with TIBA at 0.16 mmol/gCB. The polymer composition was found to be 33.5% propylene, 3.3% ENB and 63.2% ethylene. The Ti residue in the polymer was 6.5 ppm. The gum Mooney of the product was 31ML. It is clear that catalyst productivity is about same to that when CB was passivated with MMAO (Example 11).

Example 13
FA CB Passivated with TIBA at 0.08 mmol/gCB

Similar experiment as Example 11 was carried out, except that FA CB was passivated with TIBA at 0.08 mmol/gCB. The polymer composition was found to be 32.8% propylene, 4.7% ENB and 62.5% ethylene. The Ti residue in the polymer was 6.6 ppm. The gum Mooney of the product was 32ML. This experiment demonstrated that catalyst productivity is not affected by TIBA passivation when CB is passivated at 0.08–0.16 mmol/gCB.

What is claimed is:

1. A process for the gas phase production of an ethylene-propylene or ethylene-propylene-diene rubber in the presence of a single site catalyst system and also an inert particulate material in a gas phase polymerization reactor comprising pretreating the inert particulate material before commencing polymerization with a trialkylaluminum compound having the formula $AlR_3$ wherein each R is independently alkyl having 1 to 14 carbon atoms.

2. The process of claim 1 wherein the inert particulate material is pretreated in a slurry comprising (i) a diluent selected from the group consisting of aliphatic hydrocarbon having 5 to 20 carbon atoms, an aromatic hydrocarbon having about 6 to 20 carbon atoms, and mixtures thereof; and (ii) a trialkylaluminum compound wherein the ratio of trialkylaluminum compound to inert particulate material in the diluent ranges from 0.001 mmol trialkylaluminum compound per gram inert particulate material to 100 mmol trialkylaluminum compound per gram inert particulate material in the diluent.

3. The process of claim 1 wherein the inert particulate material is pretreated by combining said inert particulate material with a trialkylaluminum-diluent mixture in a gas phase reactor.

4. The process of claim 1 wherein the inert particulate material and the pretreating trialkylaluminum are introduced to the polymerization reactor separately.

5. The process of claim 1 wherein the trialkylaluminum is triisobutylaluminum.

6. The process of claim 1 wherein the inert particulate material is selected from the group consisting of carbon black, silica, clay, talc, activated carbon, modified carbon black, and mixtures thereof.

7. The process of claim 6 wherein the inert particulate material is carbon black.

8. The process of claim 1 wherein the single-site catalyst is selected from the group consisting of silyl amide catalyst having the formula $(C_5Me_4)Me_2Si(N-t-Bu)TiCl_2$, a diphenylmethylidene(cyclopentadienyl)-(9-fluorenyl) zirconium dichloride having the formula, $[C_5H_4C(C_6H_5)_2(C_{13}H_8)ZrCl_2]$ an ethylene bridged bis-fluorene zirconium dichloride, and mixtures thereof.

9. The process of claim 1 wherein the diene is ethylidene norbornene or methyloctadiene; the inert particulate material is carbon black; the single-site catalyst is a silyl amide catalyst; the trialkylaluminum is triisobutylaluminum; and wherein the carbon black and triisobutylaluminum are each introduced to the polymerization reactor separately.

10. The process of claim 1 wherein the diene is a diolefinic hydrocarbon or a vinyl aromatic compound.

11. The process of claim 1 wherein the diene is 1,4-pentadiene, 1,5-hexadiene, 5-vinyl-2-norbornene, 1,7-octadiene, 7-methyl-1,6-octadiene, vinylcyclohexene, dicyclopentadiene, butadiene, isoprene, ethylidene-norbornene or a mixture thereof.

* * * * *